United States Patent
Varone et al.

(10) Patent No.: US 7,037,227 B2
(45) Date of Patent: May 2, 2006

(54) PNEUMATIC SPINNER ASSEMBLY

(75) Inventors: Russell Varone, Red Lion, PA (US); Michael Deitz, Manchester, PA (US)

(73) Assignee: Graham Packing Company, L.P., York, PA (US)

( * ) Notice: Subject to any disclaimer, the term of this patent is extended or adjusted under 35 U.S.C. 154(b) by 269 days.

(21) Appl. No.: 10/384,683

(22) Filed: Mar. 11, 2003

(65) Prior Publication Data

US 2004/0180743 A1 Sep. 16, 2004

(51) Int. Cl.
*F16H 7/08* (2006.01)

(52) U.S. Cl. .................................. 474/101; 198/811
(58) Field of Classification Search .............. 198/811, 198/813, 810.4; 474/101, 109
See application file for complete search history.

(56) References Cited

U.S. PATENT DOCUMENTS

| | | | |
|---|---|---|---|
| 4,616,960 A | * | 10/1986 | Gladish ...................... 198/811 |
| 4,640,406 A | | 2/1987 | Willison |
| 4,927,205 A | | 5/1990 | Bowler et al. |
| 5,261,527 A | | 11/1993 | Krismanth et al. |
| 5,415,274 A | | 5/1995 | Krismanth et al. |
| 5,419,427 A | | 5/1995 | Wurgler |
| 5,542,526 A | | 8/1996 | Wurgler |
| 5,558,200 A | * | 9/1996 | Whitby et al. ........... 198/470.1 |
| 5,769,476 A | | 6/1998 | Lawn et al. |
| 2004/0087401 A1 | * | 5/2004 | Serkh .......................... 474/134 |
| 2004/0118661 A1 | * | 6/2004 | Swinderman et al. ....... 198/811 |

* cited by examiner

*Primary Examiner*—David A. Bucci
*Assistant Examiner*—Bradley J. Van Pelt
(74) *Attorney, Agent, or Firm*—Venable LLP

(57) ABSTRACT

An improved pneumatic tensioner apparatus is disclosed, the apparatus including: a main drive belt; a chuck assembly, suspended from said main drive belt, having a spinning member and a drive contact portion; a first frictional drive belt in a first track in contact with said drive contact portion operative to spin said chuck assembly; a first tension adjusting device operative to apply pressure to said first frictional drive belt tangentially to said drive contact portion; a second frictional drive belt disposed in at least one idler roller on an opposite side of said chuck assembly to said first frictional drive belt, said second frictional drive belt in contact with said drive contact portion; and a second tension adjusting device operative to apply pressure to said second frictional drive belt tangentially to said drive contact portion.

12 Claims, 4 Drawing Sheets

PNEUMATIC SPINNER ASSEMBLY

CROSS-REFERENCE TO OTHER APPLICATIONS

The following application of common assignee contains common disclosure: U.S. patent application entitled "Pneumatic Spinner Drive Tensioning Assembly," Ser. No. 10/384,740, the contents of which are incorporated herein by reference in their entirety.

BACKGROUND OF THE INVENTION

1. Field of the Invention

The present invention relates generally to an apparatus for, and method of, rotating bottle-holding chuck assemblies, particularly during coating application, to ensure correct bottle positioning during bottle finishing operations, for instance during exposure to coating application, to provide for coating around the entire bottle circumference

2. Related Art

In the bottle manufacturing industry, bottles move through various manufacturing steps suspended from chuck assemblies, which are themselves, moved by belt systems. One manufacturing step can include the application of a coating to a bottle. Such coatings can include resins to improve gas impermeability of the bottles, and coating to impart color to the bottle. Coatings can also be referred to generically as "paint." As the bottles are moved through coating application steps, the bottles are spun in order to achieve a uniform application of the coating around the entire bottle. A major defect results when a bottle fails to spin correctly during coating application. A misapplication of coating causes a bottle to be scrapped. Numerous parts of the machine for coating the bottles are also subject to deposits from the coating material and subsequent operational failure.

A linear belt drive, for example, one designed by Feco Engineered Systems, Ltd. of Cleveland, Ohio, U.S.A., uses a series of idler rollers to provide belt-to-chuck contact. The Feco assembly uses a single drive belt mounted on a single side of the chuck assembly with no counterbalancing force. The single-sided application of tensioning force leads to slipping belts, which can cause misalignment. For example, belt slippage can cause misalignment of a bottle with respect to an anticipated position of the bottle for coating application.

Conventional assemblies do not provide positive contact with the chuck assembly throughout the track length. Instead, conventional assemblies provide contact only at a series of tangent points along the track.

Conventional assemblies also do not allow "on the fly" adjustments to the contact tension to compensate for variability in the bottles. Instead, a lengthy adjustment process must be done which is very operator dependent.

What is needed then is an improved assembly that overcomes shortcomings of conventional solutions.

SUMMARY OF THE INVENTION

In an exemplary embodiment of the present invention a pneumatic spinner drive tensioning apparatus is disclosed. The apparatus includes: a main drive belt; a chuck assembly, suspended from the main drive belt, having a spinning member and a drive contact portion; a first track comprising a plurality of air holes; a first frictional drive belt in the first track in contact with the drive contact portion operative to spin the chuck assembly; a first tension adjusting device operative to apply pressure to the first frictional drive belt tangentially to the drive contact portion, the first tension adjusting device comprising a second track comprising a plenum through which air flows disposed on an opposite side of the first track from the first frictional drive belt, and coupled to the first track, wherein air from the plenum flows through the plurality of air holes and applies pressure to the first frictional drive belt; a second frictional drive belt disposed in at least one idler roller on an opposite side of the chuck assembly to the first frictional drive belt, the second frictional drive belt in contact with the drive contact portion; and a second tension adjusting device operative to apply pressure to the second frictional drive belt tangentially to the drive contact portion.

In another exemplary embodiment, the present invention can be a method of applying a coating to a container comprising the steps of: attaching a container to a chuck having a contact portion and a spinning member; contacting the contact portion with a first frictional drive belt disposed in a track having air holes; blowing air through the air holes against the first frictional drive belt to increase contact of the frictional drive belt with the contact portion; moving the chuck in a first direction at a first speed; moving the frictional drive belt in at least one of a second direction and a second speed in order to spin the chuck and the container; applying pressure on an opposite side of the contact portion from the first frictional drive belt with a second frictional drive belt; adjusting the pressure to the first frictional drive belt by adjusting the blowing air; and applying a coating to the spinning container.

In another exemplary embodiment, the present invention can be an pneumatic tensioner apparatus, comprising: a main drive belt; a chuck assembly, suspended from the main drive belt, having a spinning member and a drive contact portion; a first track comprising a plurality of air holes; a first frictional drive belt in the first track in contact with the drive contact portion operative to spin the chuck assembly; a first tension adjusting device operative to apply pressure to the first frictional drive belt tangentially to the drive contact portion, the first tension adjusting device comprising a second track comprising a plenum through which air flows disposed on an opposite side of the first track from the first frictional drive belt, and coupled to the first track, wherein air from the plenum flows through the plurality of air holes and applies pressure to the first frictional drive belt; a second frictional drive belt disposed in at least one idler roller on an opposite side of the chuck assembly to the first frictional drive belt, the second frictional drive belt in contact with the drive contact portion; and a second tension adjusting device operative to apply pressure to the second frictional drive belt tangentially to the drive contact portion, the second tension adjusting device comprising: an adjustable shaft coupled to the at least one idler roller; a tension spring coupled to the adjustable shaft wherein the tension exerted by the tension spring on the adjustable shaft determines a position of the adjustable shaft; and an adjustment screw coupled to the tension spring and operative to adjust tension exerted by the tension spring; wherein the pressure applied by the second tension adjusting device on the drive contact portion is adjusted by adjusting the position of the adjustable shaft.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

The present invention constitutes an improvement on the apparatus disclosed in the U.S. patent application entitled "Pneumatic Spinner Drive Tensioning Assembly," Ser. No. 10/384,740, of common inventorship and assignee, the contents of which are incorporated herein by reference in their entirety. In that apparatus, pneumatic tubes are used to apply pressure using non-stick tracks on both sides of a rotating chuck assembly, causing it to spin uniformly. While that apparatus is beneficial in that it has few moving parts and is inexpensive to build, it is less effective when the manufacturing process moves at high speeds. Additionally, the pneumatic tubes eventually must be replaced, adding to maintenance costs. Also, the non-stick tracks can add maintenance costs as the non-stick tracks wear down over time and are costly to replace.

In an exemplary embodiment of the present invention, a pneumatic tensioner provides a full length contact path on both sides of a chuck assembly and provides a positive, balanced frictional force to rotate the chuck assembly. The invention can be used for any application where a part suspended from a device having a circular contact portion requires even rotation. Such applications can include, for example, applying a coating or paint to the suspended parts, and drying or curing a suspended part.

Figure 1:
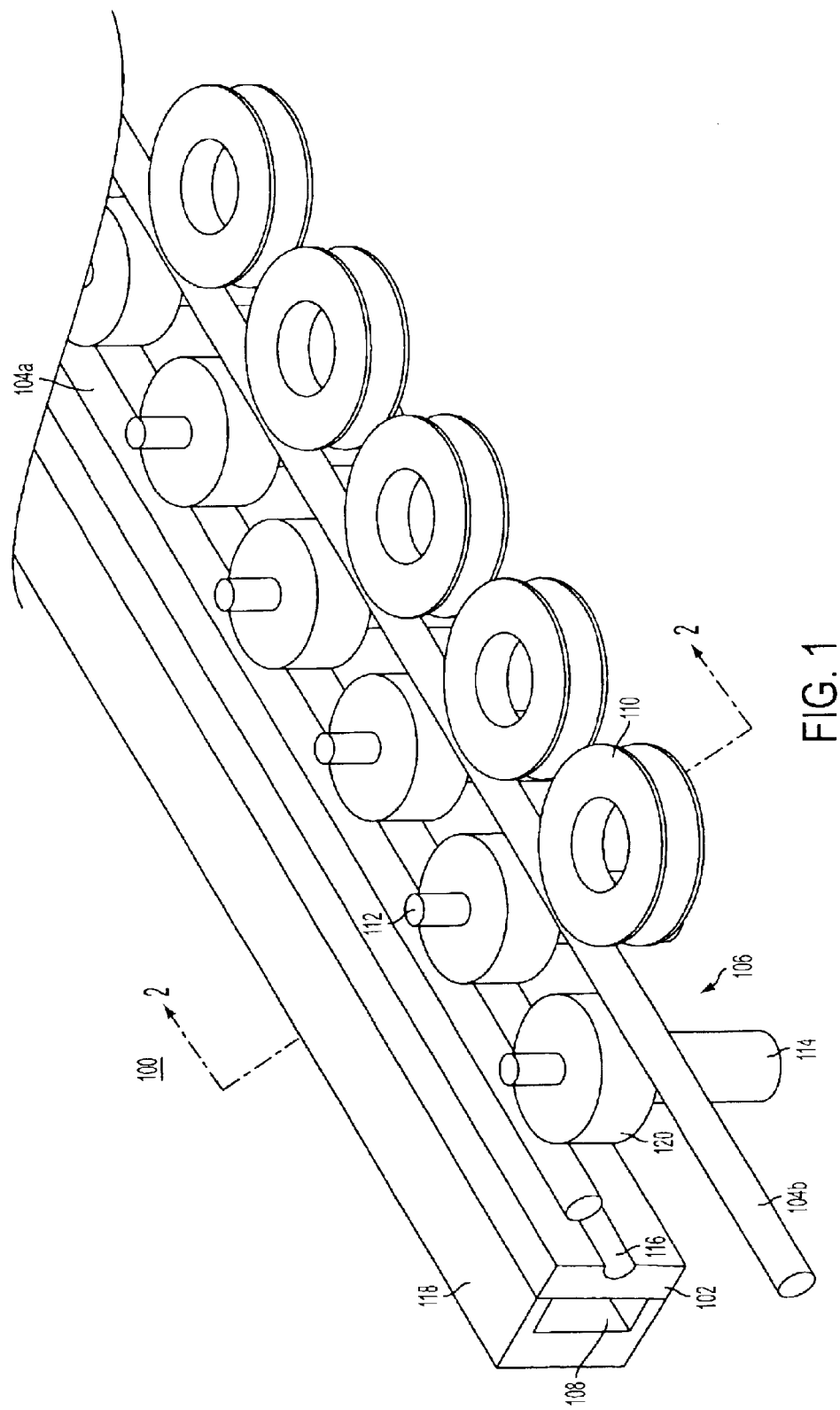
FIG. 1 shows an isometric view of an exemplary embodiment of the present invention.

FIG. 1 shows an isometric view 100 of an exemplary embodiment of a pneumatic tensioner system of the present invention. A track 102 holds an outer side of a frictional drive belt 104a. An inner side of the frictional drive belt 104a is in contact with a first side of a drive contact portion 120, also called a drive lug, of a chuck assembly 106. An inner side of frictional drive belt 104b is in contact with the opposite side of drive contact portion 120. Each chuck assembly can hold a suspended bottle (not shown) from a spindle shaft 114. The outer side of the frictional drive belt 104b is supported by idler rollers 110. The two inner sides of the frictional drive belts 104a and 104b move in opposite directions with respect to each other, imparting a spin to the chuck assemblies 106, and hence to the bottles. The chuck assemblies 106 are coupled, via a locking collar 112 on a spindle shaft, to a main drive belt (not shown), which imparts an overall forward motion to the line of bottles.

The track 102 is coupled to a second track 118. Either of the tracks 102 and 118 can be manufactured from a metal or other rigid material. Track 102 can include a smooth surface or a coating. The groove of track 102 may or may not include a coating such as, e.g. a non-stick coating. In an exemplary embodiment, the track 102 can include, as shown, a semi-circular cylindrical concave groove (not labeled) for contacting frictional drive belt 104a. The track 118 forms an open plenum 108 behind the track 102 through which air can flow. The track 102 has air holes 116 through which air from the plenum can flow.

Figure 2:
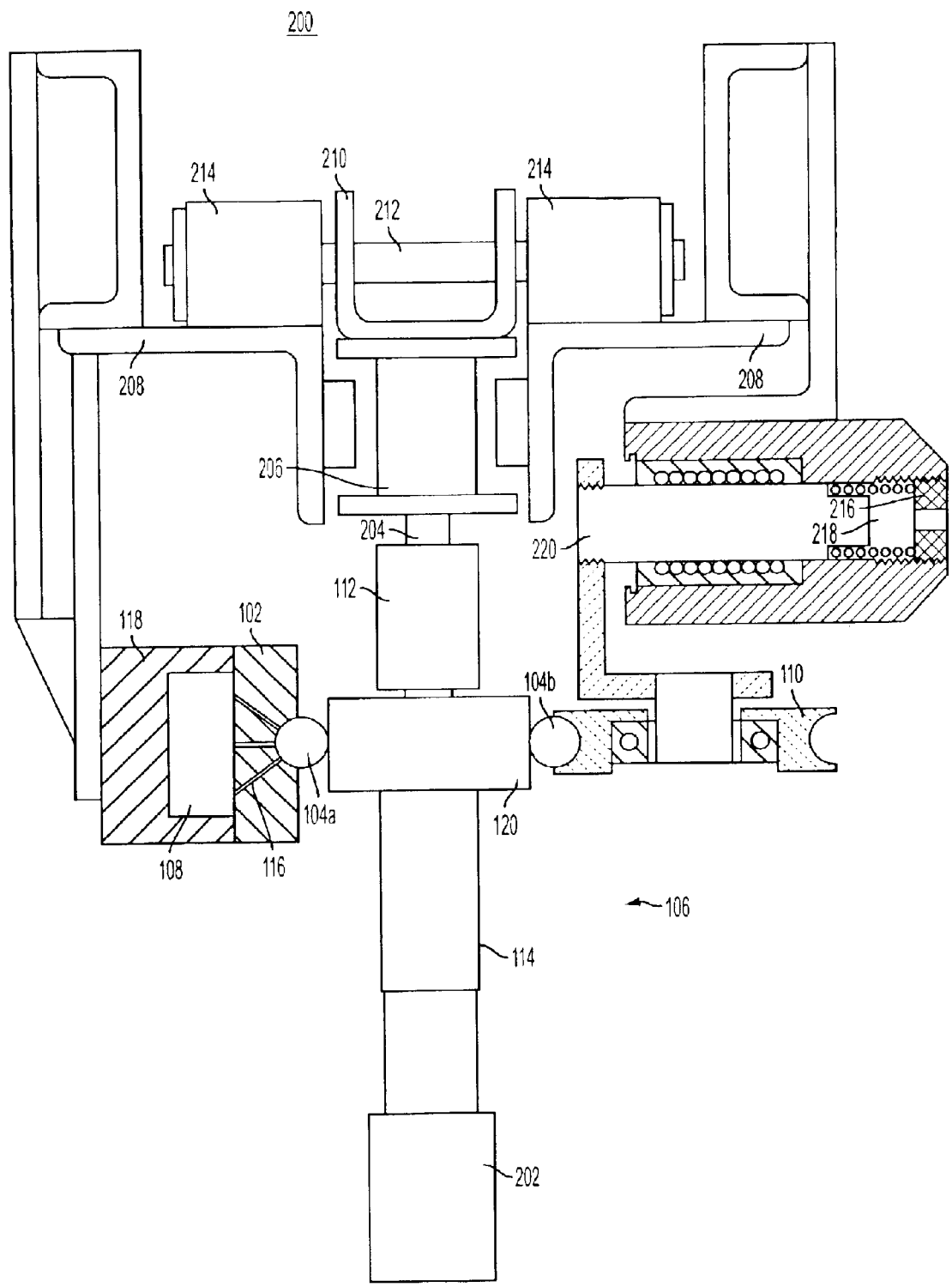
FIG. 2 shows a cross-sectional view along line 1—1 of FIG. 1.

FIG. 2 shows a cross-sectional view 200 of the pneumatic tensioner system along line 1—1 of FIG. 1. The outer side of the frictional drive belt 104a moves through the groove in track 102. The air holes 116 allow the air from the plenum 108 to flow from the plenum and against the outer side of the frictional drive belt 104a. The air flowing through the holes 116 both applies pressure to the frictional drive belt 104a to keep the belt in tangential contact with the first side of the drive contact portion 120 of the chuck assembly 106, and also acts to lubricate the track 102 to keep the frictional drive belt 104a from sticking to the track 102.

On the opposite side of the drive contact portion 120 is the inner side of the frictional drive belt 104b. The frictional drive belt 104b moves through a groove in the idler roller 110. The idler roller 110 is free to rotate and acts to apply pressure against the outer side of the frictional drive belt 104b, whose inner side in turn applies pressure against the drive contact portion 120. The idler roller 110 is coupled to a shaft 220, which is in turn coupled to a tension spring 218. The tension in the tension spring 218 can be varied by an adjusting screw 216. Varying the tension in the spring 218 causes the shaft 220 to move back and forth horizontally, changing the position of the idler roller 110 with respect to the chuck assembly 106. Bringing the idler roller 110 closer to the chuck assembly 106 increases the tangential pressure on the chuck assembly 106 from the frictional drive belt 104b, and moving the idler roller 110 further away reduces the pressure on the chuck assembly 106.

The chuck assembly 106 has a shaft 114 ending with a spindle nose 202, which holds the bottle during the coating process. The chuck assembly 106 is coupled to the main drive belt 206 via a carrier pin 204. The main drive belt 206 can be a carrier chain. The main drive belt 206 is coupled to a bracket 210. The bracket 210 is supported by an axle 212 in an opening at each end of the bracket 210. On each end of the axle is a roller 214. The rollers 214 roll along the surfaces of two L-brackets 208 as the main drive belt 206 moves the chuck assembly 106 forward through the manufacturing process.

The use of air through the plenum 108 and air holes 116 according to the present invention eliminates the need for pneumatic tubes, which require periodic replacement, and eliminates the need for a low-friction track material. In another exemplary embodiment, a low-friction track material may still be used. While the cost of constructing the apparatus of the present invention may be higher than that of the apparatus of the related application, the present invention is better suited to higher speed operation. Additionally, the present invention provides even greater control over the pressure exerted by the frictional drive belts 104 onto the chuck assemblies 106.

Figure 3:
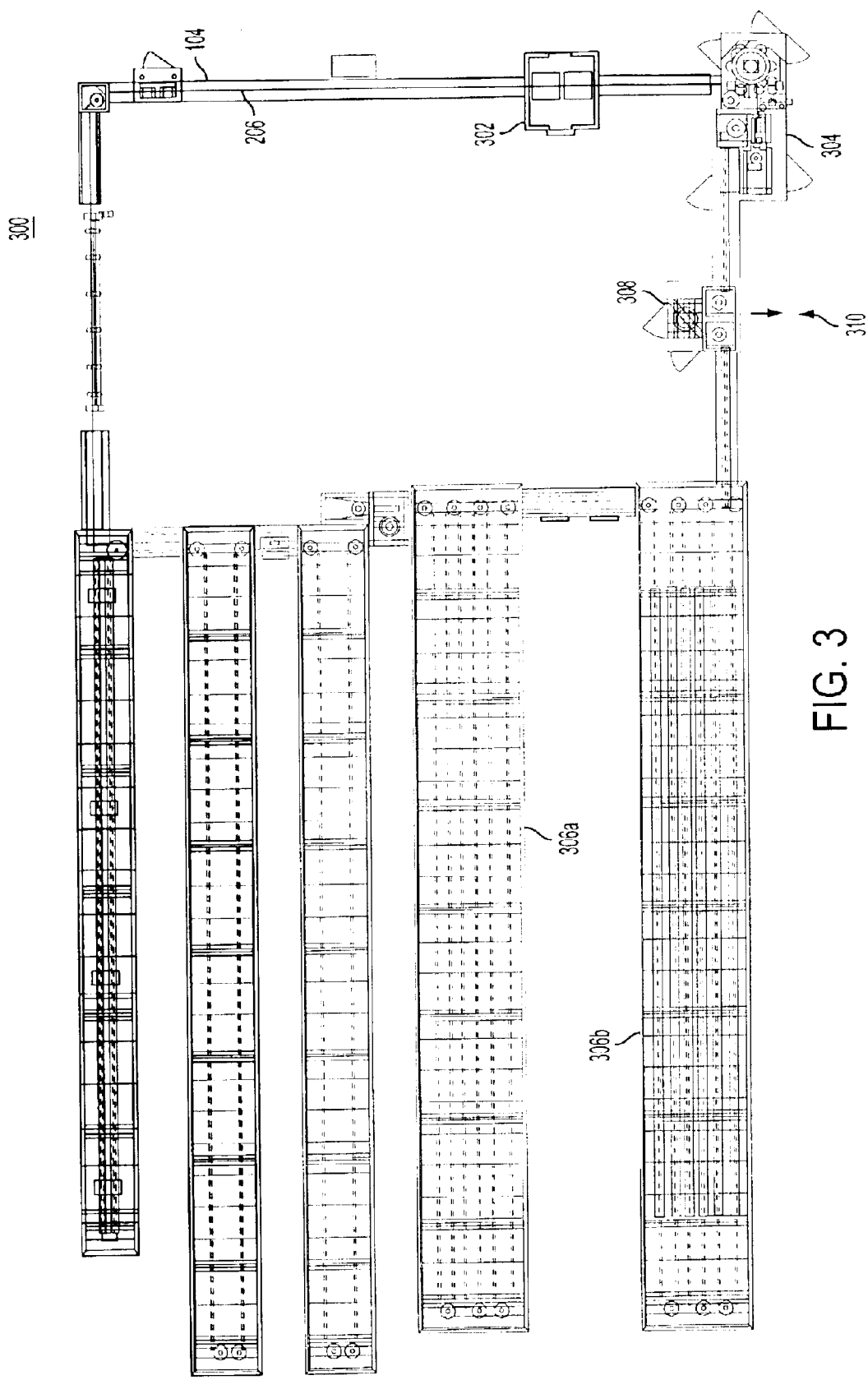
FIG. 3 shows a top view of the system of the present invention.

FIG. 3 shows a top view 300 of an exemplary embodiment of a closed-loop system using the pneumatic tensioner system according to the present invention. The main drive belt 206 is driven by drive 304. An example drive 304 is described in U.S. Pat. No. 5,769,476 to Lawn et al., filed Sep. 16, 1996, entitled "Apparatus and Method for Handling and Processing Articles," the contents of which are incorporated herein by reference in their entirety. As bottles suspended from the main drive belt 206 pass through the spray booth 302, the bottles are spun by frictional drive belt 104 while coating is applied. The bottles proceed through ovens 306a and 306b where the coating dries. The dry, coated bottles are then unloaded from the main drive belt 206 at unloader 308 and can be taken away by a take-away conveyor indicated by arrow 310.

Figure 4:
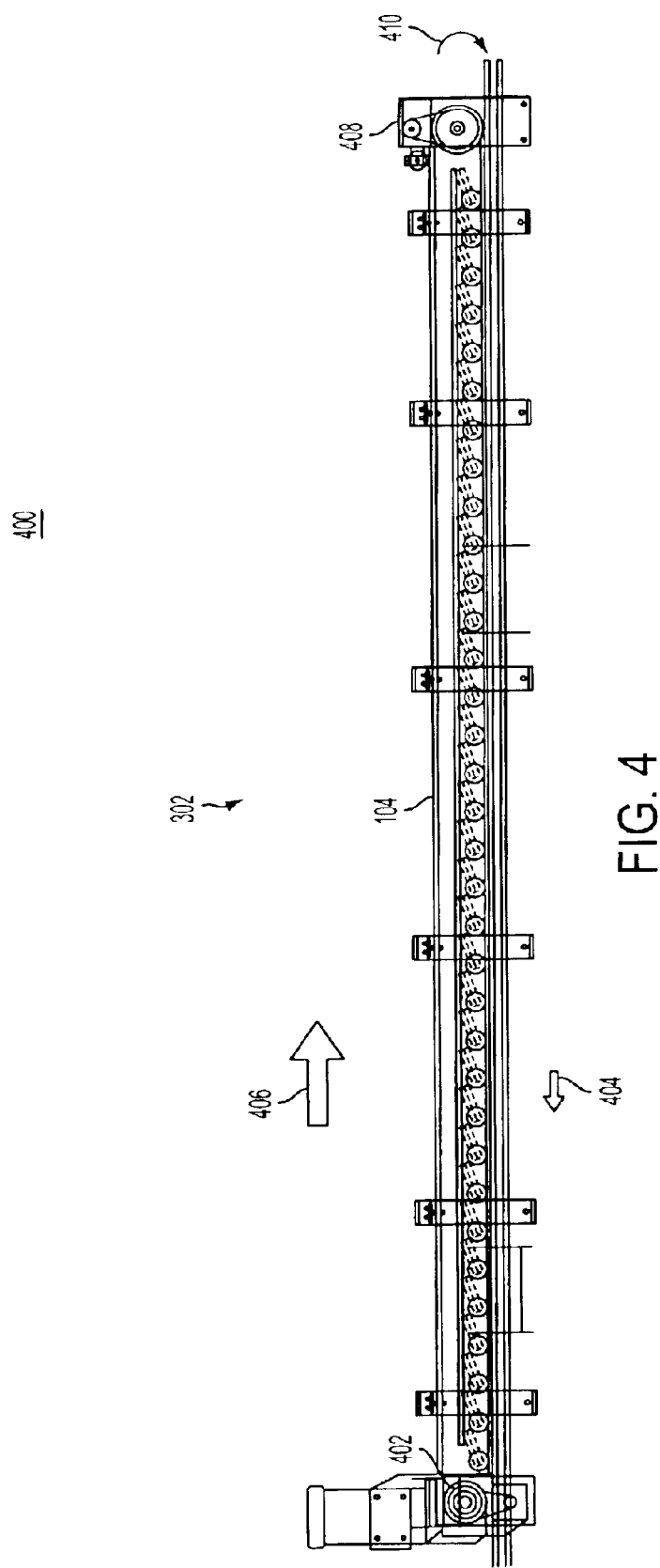
FIG. 4 shows a top view of the system of the present invention inside a spray booth.

FIG. 4 shows a top view 400 of an exemplary embodiment of the pneumatic tensioner system of the present invention inside the spray booth 302. The frictional drive belt 104 is driven by spinner drive 402 in the direction indicated by arrows 404 and directed arc 410. At the end opposite the spinner drive 402, the frictional drive belt turns around the automatic take-up 408 as illustrated by directed arc 410. The main drive belt (not shown) moves in the direction indicated by arrow 406.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A pneumatic tensioner apparatus, comprising:
    a main drive belt;
    a chuck assembly, suspended from said main drive belt, having a spinning member and a drive contact portion;
    a first track comprising a plurality of air holes;
    a first frictional drive belt in said first track in contact with said drive contact portion operative to spin said chuck assembly;
    a first tension adjusting device operative to apply pressure to said first frictional drive belt tangentially to said drive contact portion, said first tension adjusting device comprising a second track comprising a plenum through which air flows disposed on an opposite side of said first track from said first frictional drive belt, and coupled to said first track, wherein air from said plenum flows through said plurality of air holes and applies pressure to said first frictional drive belt;
    a second frictional drive belt disposed in at least one idler roller on an opposite side of said chuck assembly to said first frictional drive belt, said second frictional drive belt in contact with said drive contact portion; and
    a second tension adjusting device operative to apply pressure to said second frictional drive belt tangentially to said drive contact portion.

2. The pneumatic tensioner apparatus of claim 1, wherein said second tension adjusting device comprises an adjustable shaft coupled to said at least one idler roller, wherein the pressure applied by said second tension adjusting device on said drive contact portion is adjusted by adjusting the position of said shaft.

3. The pneumatic tensioner apparatus of claim 2, wherein said adjustable shaft is coupled to a tension spring, said tension spring coupled to an adjustment screw operative to adjust tension exerted by said tension spring, and wherein said tension exerted by said tension spring on said shaft determines a position of said shaft.

4. The pneumatic tensioner apparatus of claim 1, wherein said first and second frictional drive belts are the same continuous belt.

5. The pneumatic tensioner apparatus of claim 1, wherein said first and second frictional drive belts move in opposite directions.

6. The pneumatic tensioner apparatus of claim 1, wherein said first frictional drive belt moves in a direction opposite said main drive belt.

7. The pneumatic tensioner apparatus of claim 1, wherein said main drive belt comprises a carrier chain.

8. A pneumatic tensioner apparatus, comprising:
    a main drive belt;
    a chuck assembly, suspended from said main drive belt, having a spinning member and a drive contact portion;
    a first track comprising a plurality of air holes;
    a first frictional drive belt in said first track in contact with said drive contact portion operative to spin said chuck assembly;
    a first tension adjusting device operative to apply pressure to said first frictional drive belt tangentially to said drive contact portion, said first tension adjusting device comprising a second track comprising a plenum through which air flows disposed on an opposite side of said first track from said first frictional drive belt, and coupled to said first track, wherein air from said plenum flows through said plurality of air holes and applies pressure to said first frictional drive belt;
    a second frictional drive belt disposed in at least one idler roller on an opposite side of said chuck assembly to said first frictional drive belt, said second frictional drive belt in contact with said drive contact portion; and
    a second tension adjusting device operative to apply pressure to said second frictional drive belt tangentially to said drive contact portion, said second tension adjusting device comprising:
        an adjustable shaft coupled to said at least one idler roller;
        a tension spring coupled to said adjustable shaft wherein said tension exerted by said tension spring on said adjustable shaft determines a position of said adjustable shaft; and
        an adjustment screw coupled to said tension spring and operative to adjust tension exerted by said tension spring;
        wherein the pressure applied by said second tension adjusting device on said drive contact portion is adjusted by adjusting the position of said adjustable shaft.

9. The pneumatic tensioner apparatus of claim 8, wherein said first and second frictional drive belts are the same continuous belt.

10. The pneumatic tensioner apparatus of claim 8, wherein said first and second frictional drive belts move in opposite directions.

11. The pneumatic tensioner apparatus of claim 8, wherein said first frictional drive belt moves in a direction opposite said main drive belt.

12. The pneumatic tensioner apparatus of claim 8, wherein said main drive belt comprises a carrier chain.

\* \* \* \* \*